United States Patent [19]

Sauron et al.

[11] Patent Number: 5,620,625
[45] Date of Patent: Apr. 15, 1997

[54] METHOD OF BUTT-WELDING TWO PLASTIC PARTS WITH AN IDENTIFYING CODE, USING AN AUTOMATICALLY CONTROLLED ELECTRO-WELDING MACHINE

[75] Inventors: Jean Sauron, Draveil; J. C. Hugueny, Ormesson, both of France

[73] Assignees: Gaz de France (Service National), Paris; Ste. Joseph Sauron Materiel Industriel, (S.A.), Athis-Mons, both of France

[21] Appl. No.: 338,624
[22] PCT Filed: May 28, 1993
[86] PCT No.: PCT/FR93/00518
    § 371 Date: Nov. 23, 1994
    § 102(e) Date: Nov. 23, 1994
[87] PCT Pub. No.: WO93/24301
    PCT Pub. Date: Dec. 9, 1993

[30] Foreign Application Priority Data

Jun. 1, 1992 [FR] France .................................. 92 06616

[51] Int. Cl.⁶ .................................................. H05B 1/02
[52] U.S. Cl. ................... 219/494; 219/535; 219/506; 219/497; 156/304.2; 156/379.7
[58] Field of Search ................................. 219/505, 497, 219/535, 544, 506, 533; 156/274.2, 273.9, 304.2, 379.7, 272.2; 205/286, 292

[56] References Cited

U.S. PATENT DOCUMENTS 4,323,773  4/1982  Carpenter.
4,642,155  2/1987  Ramsey .................................. 156/359
5,013,376  5/1991  McElroy, II et al. ..................... 156/64
5,130,518  7/1992  Merle ..................................... 219/497

FOREIGN PATENT DOCUMENTS 0196795    3/1986   European Pat. Off..
0335010   12/1988   European Pat. Off..
2572326    5/1986   France.
9114932    3/1992   Germany.
2049994   12/1980   United Kingdom.
2208310    3/1989   United Kingdom.
WO900112   1/1990   WIPO.

OTHER PUBLICATIONS

Kunstof and Rubber 1990, #10 by Meijerink et al pp. 59–61.

*Primary Examiner*—Mark H. Paschall
*Attorney, Agent, or Firm*—Rothwell, Figg, Ernst & Kurz, P.C.

[57] ABSTRACT

The invention is concerned with a method of butt-welding two plastic parts each equipped with an identifying code, using an automatically controlled electro-welding machine. A device for performing a welding program is associated with said machine, said program being implemented as a function of the data contained within the identification codes. The data are defined on the basis of a welding law or standard to be applied as a function of various values for parameters relating at least to the thickness and diameter (or cross section) of the part considered at its abutment end, to the temperatures, lengths of time and welding pressure to be employed, the type of material constituting the part and the index or range of indices of fluidity of said material therefore defining the dynamic viscosity so that it would be possible to butt-weld tube parts if the codes of the parts are recognized as being compatible per se. In addition, it is necessary to be able to prohibit welding if the codes are recognized as being incompatible. Application to the welding of polyethylene tubes in particular.

12 Claims, 4 Drawing Sheets

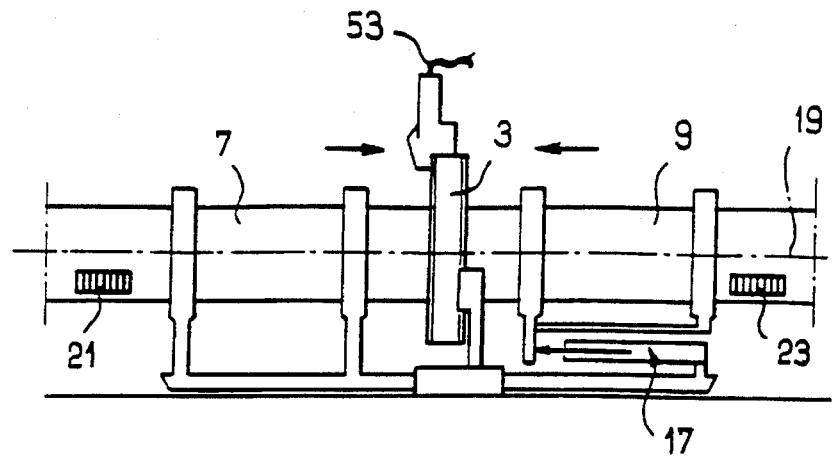
FIG_3
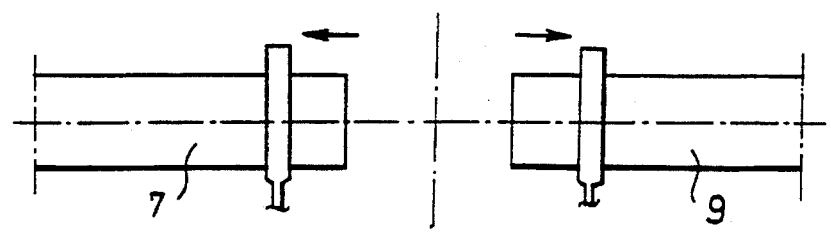
FIG_4
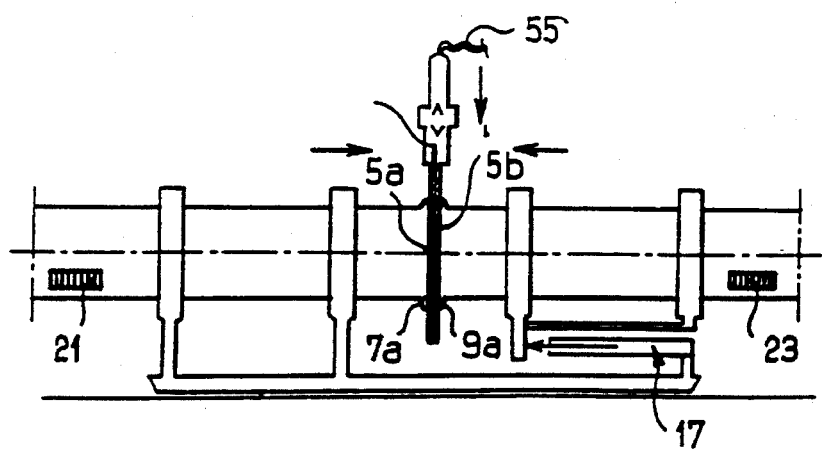
FIG_5
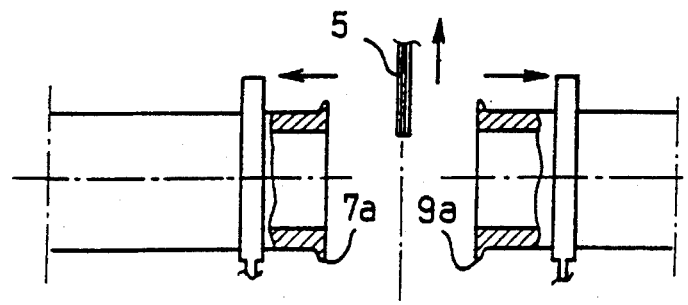
FIG_6
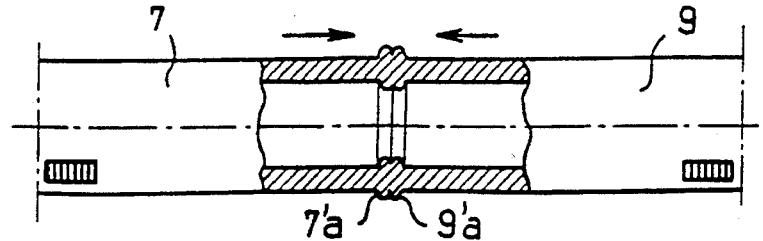
FIG_7

METHOD OF BUTT-WELDING TWO PLASTIC PARTS WITH AN IDENTIFYING CODE, USING AN AUTOMATICALLY CONTROLLED ELECTRO-WELDING MACHINE

The invention relates to the field of using butt-welding for connecting parts made from a plastics material and in particular parts made from polyethylene.

Butt-welding is a known technique which is carried out by bringing into contact two oppositely facing ends of two parts which are to be joined, the abutting ends in question of the parts being previously heated to their softening or fusion temperature so that their contact under pressure ensures a satisfactory weld once they have cooled.

Although machines are currently available which make it possible in particular to heat up the abutting ends of the parts, it is on the other hand currently left to the discretion and competence of the operators to establish in particular the dimensional and qualitative compatibilities of the parts to be assembled and to adapt the welding criteria to be respected.

In practice, the outcome is a certain number of errors prejudicial to the reliability of the networks and pipes, the quality of the welds depending on the competence of the operators and the conditions under which they intervene.

Well, for the ever-increasing number of applications and in particular for establishing networks for the distribution of a fluid (gas, air or other industrial liquids), it is found that increasingly more frequent use is made of tubes of plastics material which, in a number of cases, have to be butt-welded under heat in the manner described briefly hereinabove.

Furthermore, there are various standards or criteria for welding and the manufacturers or users of parts have to comply with them, which further increases the risks of errors in interpretation.

SUMMARY OF INVENTION

The object of the invention is to provide a solution which makes it possible markedly to reduce these risks, ensuring a security of procedure and reliability of the welds whatever the working conditions may be in practice.

To this end, the invention proposes a method of selectively butt-welding two tubular parts of plastics material using an automatically controlled machine, in which process:

a) an identification code adapted to be scanned by the scanning means of the machine is associated with each of the parts, b) data relating a least to certain of the following characteristics are entered in an order and at specific positions for each code:

$b_1$) thickness and/or outside diameter of the part in question, at its end where it has to be welded substantially coaxially to the other part, $b_2$) temperature or range of temperature corresponding to that to which an electric heating element has to be raised for the abutment end of the said part to reach the softening temperature appropriate for welding, $b_3$) the period of time during which the said part has to be placed in contact with the heating element, $b_4$) period of time during which the said part has to be pressed against the other part, $b_5$) pressure or range of pressure corresponding to that which the said part must undergo during the said period of time according to $b_4$, $b_6$) type of plastics material constituting the part, and $b_7$) index or range of indices of fluidity of the said material, c) the data of the said codes are acquired by the said scanning means, d) the machine carries out a comparison of the codes, datum by datum, e) if, respectively, the data acquired and relating to the said characteristics $b_1$) to $b_7$) of the two codes are in accord in pairs, at least in some cases, a compatibility between codes is recognised and a series of values common to the two parts is determined relatively and respectively at least:

to the temperature T to which the heating element has to be raised for the abutting ends of the parts to reach their the softening temperature appropriate to welding them, to the time $t_1$ for which the said parts have to be placed in contact with this heating element, to the pressure P to be exerted on at least one of the said parts to press the one against the other, and to the time $t_2$ for which the contact pressure has to be maintained between the parts, f) and this series of values is supplied to the welding programme associated with the machine in order to allow welding of the parts as a function at least of the said values determined according to e).

In this way, the parts may be joined with virtually no risk of error as to their compatibility and the essential parameters of welding to be respected.

In practice, the "concordances" to which reference is made in stage e) may be strict (identity between the values corresponding to the characteristics relative to each code) or "relative" (compatibility recognised when the values match in certain predetermined ranges of tolerances, or if the ranges of attributed values overlap.

On the hypothesis that such a "relative" compatibility will be acknowledged, then the series of aforesaid values (T, P, $t_1$, $t_2$) needed to determine the welding conditions may in particular be obtained mechanically by machine, using an integrated computer unit of calculation providing a mean value for each parameter T, P, $t_1$, $t_2$ on the basis of values subject to tolerances or ranges of concordant values scanned over the codes.

Within the framework of the welding operations taken as a whole, a field to which the invention likewise relates, it will furthermore be noted that according to another characteristic feature, rather than entering "in clear" in each code values (or ranges of values) of the parameters $b_1$) to $b_5$) in question (for example 210 to 230 for the range of heating temperature in ° C. allowed, according to $b_2$, or even 070–120 for the lapse of time in seconds according to $b_3$ . . . , etc.), it is possible to regroup in each code at least some of the said data $b_1$ to $b_5$ under a specific welding standard reference (example: code 1 for the French standard, code 2 for the US standard . . . ). In parallel, there will then be associated with the machine a specific memory unit in which scales of values relative to these regrouped data will be stored. And on the basis of these scales of values, there will be attributed for each code the values corresponding to each of the said data regrouped under the standard reference; then, at stage e), the attributed values will be compared code by code and if these values agree, the said values for temperature, pressure and time ($t_1$, $t_2$, T, P) common to the two parts will be determined, preferably by calculation of mean values or by applying a correcting coefficient as a function of the standard references appropriate to the codes.

Such a coded "regrouping" ought to be interesting above all if one has to work with a number of welding standards (DVS standard, American standard . . . ).

In practice, it may then be very advantageous not to have to input into the memory of the machine all the standards with their associated parameters, so avoiding an overloaded data system which will in time become difficult to administer.

However this may be, it will be understood that as a function of the evolution of the standards imposed by the world, the invention does in particular make it possible to work either on the basis of a "general" standard if it exists (European standard, for example, if welding has to be carried out in Europe with parts made in Europe, or even a "world" or ISO standard), in other words on the basis of two referenced standards, each referred to in the code of one of the two parts to be welded, the tables of compatibility and of values proper to these codes entered into the machine's memory then making it possible to approve welding or not, and to carry this through, if the compatibility of the parts is recognised by the machine.

Further characteristic features and advantages of the invention will become apparent from the more detailed description which will follow, reference being made therein to the accompanying drawings which are given solely by way of non-limitative example and in which:

BRIEF DESCRIPTION OF DRAWINGS

FIGS. 3, 4, 5, 6 and 7 diagrammatically illustrate the principle stages prior to leading to a butt-welding of two tubes.

DETAILED DESCRIPTION OF DRAWINGS

Figure 1:
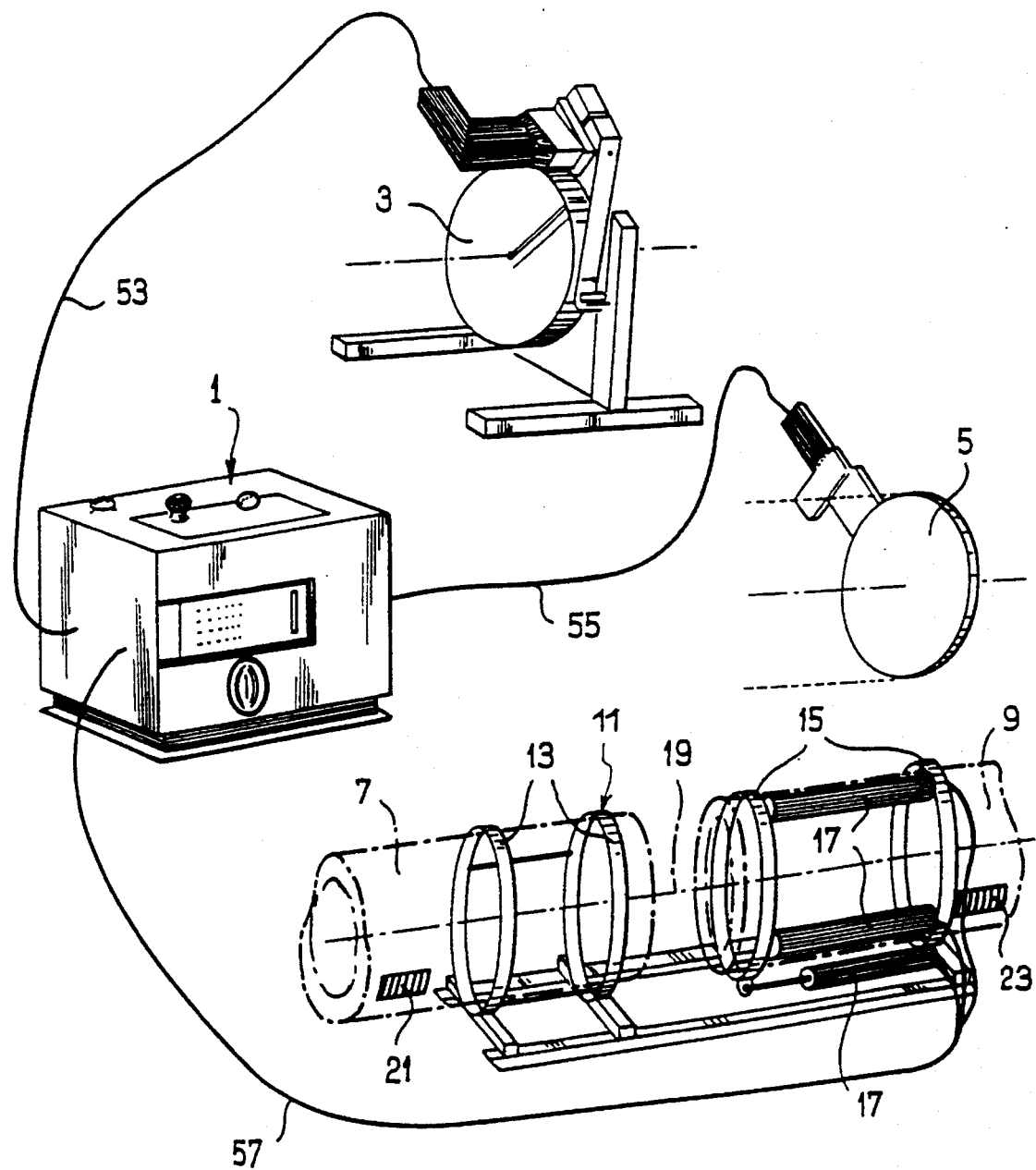
FIG. 1 is an overall view of a butt-welding apparatus.

First of all, FIG. 1 shows a welding machine comprising a control box 1 having at least three electrical outputs for connection by suitable cables firstly to a device 3 which makes it possible to straighten up the ends of the parts and on the other to a means 5 of heating said straightened ends, said heating means frequently being referred to as a "heating mirror", and finally to a jack unit 17 connected to the frame on which the tubes have been coaxially installed.

To maintain the parts such as in this case the two tubes 7 and 9 in position, the machine therefore comprises a frame 11 having two looping assemblies 13, 15 equipped with clamping means forming jaws to maintain the tubes (not shown), the loops associated with the jack unit 17 making it possible to displace the two tubes in the axis 19 along which they have been placed.

With the exception of a part of the interior structure of the casing 1 relative to automation of the welding process which will be described hereinafter, the monitoring machine briefly referred to hereinabove is known per se.

Machines of this type are in particular manufactured and distributed by the company "WIDOS" (SCHILLER STRASSE 48, A-2 351 Wr. NEUDORF, particularly under the reference 4400 CNC Unit) or even "FUSION GROUP" (UK—Chesterfield Trading Estate—Sheepbridge—CHESTERFIELD, reference S419 pz).

It should be noted simply that such a machine also makes it possible to true up the end faces of the parts at right-angles to their axis, align these ends and move the said parts towards or away from each other while making it possible to insert or withdraw the heating mirror and face-finishing apparatus (also see Patent EP 196 795 or the publication "KUNSTOFF EN RUBBER", vol. 33, No. 10, October 1990—ROTTERDAM; pages 59 to 61; J. C. MEIJERINK).

In accordance with the invention, each of the two tubes 7, 9 in FIG. 1 has been provided with an identifying code 21, 23 which can take the form of a badge or a label fixed on or associated with the tubes and of the bar code type, possibly a magnetic strip or electronic tag in particular, or any other system connected with the development of coding technology.

All the data useful to welding are entered into these identifying codes, for example when they emerge from production.

As it happens, each code 21 or 23 comprises a succession of different zones which can be scanned by a suitable reading means. These zones contain data (parameters or reference values) as a function of which a machine, a welding data programme, will be set in motion.

In particular, if welding can be carried out on the basis of common standards, each identifying code will preferably include coded data relating at least to the thickness and diameter (or cross-section) of the part considered at its abutment end; to the temperature or range of temperatures corresponding to that to which the element 5 has to be raised to ensure a suitable localised softening of the said part; to a length of time during which the said part has to be placed in contact with one of the two heating surfaces of the element 5; to the period of time during which this same part has to undergo pressure at its abutment end in contact with the other part; to the pressure or range of pressure corresponding to that which the part has to overcome throughout the aforesaid period of time, but likewise advantageously to the type of material (low density polyethylene: PEBD; PEHD; PEMD; PMMA . . . ) constituting the part and the index or range of indices of fluidity of the said material therefore defining its dynamic viscosity, the more so that instead of tubes, it is possible first of all to have to butt-weld a tube and a connecting piece (such as a T or V-union or a bend . . . ), that is to say two connecting pieces such as a T followed by an elbow). Consequently, it is then necessary to be able to recognise them particularly in order to prohibit their welding if they are not compatible, for example in terms of diameter of material.

Furthermore, the codes may incorporate, preferably in another zone, data relative to the metric length of the parts (if they are tubes) and/or their inside diameter. The date of production of the parts (or a date by which welding is possible) and the identity of the manufacturer may likewise prove useful.

By way of example, the data contained in the codes might furthermore be distributed as follows:

Seven zones could be set aside on a bar code with six successive zones for defining and a seventh for a monitoring zone.

The first zone may comprise three characters, reserved for example to the identity of the manufacturer. The first digit may serve to identify the country (1 to 9), the second and third digits identifying a serial number.

In the second zone, comprising two characters, the first character could be reserved for identification of the material (1 for high density polyethylene, 2 for polypropylene . . . and so on up to 9), the second character making it possible to input an essential parameter such as the fluidity index (of course, more than one character will be upheld if one is to enter a range of fluidity indices. Four characters may be required).

The third zone may be reserved for indicating the thickness, the outside and inside diameters of the part in question, this for example over six characters, by differentiating the dimensions in millimeters (international system) and in inches (system CTS or IPS).

In zone 4, with five characters, it is possible to indicate the date of manufacture of the part in question (five characters) as well as the date when the product lapses (two characters).

The four-character zone 5 may include the length of the tube if this is expressed. If it is a connecting piece (a V- or T- junction), the entry could read: 0000.

For instance, zone 6 of for instance 26 characters could in particular show, in sequence:

a)—the temperature or range of temperatures corresponding to that to which the heating element 5 has to be raised for the connecting end of the corresponding part to reach the softening temperature at which it can be welded. Seven characters might be set aside for this purpose. Thus, the coded value 220 to 240 could for instance be input into this first part of zone 6 if the 220° to 240° C. range of temperature is adopted;

b)—the period of time for which the part in question needs to be placed in contact with the heating element 5. Seven characters could be allocated. For example, if the period of time in question has to be limited to between 50 and 80 seconds, the following coded data should be entered into the code: 050-080. It is also possible to input the datum 0000045 if the maximum time allowed is 45 seconds;

c)—the period of time for which the part in question must then undergo pressure against the other part. Once again, seven characters can be reserved to input the corresponding period which, in the known examples, normally ranges between about 4 to 5 minutes and over 30 minutes for the thickest parts;

d)—the pressure or range of pressures corresponding to that to which the part must be exposed for the aforementioned period of time. This pressure could for instance be indicated in hundredths $N/mn^2$. Five characters could be used. Thus, it is possible to input 12 to 17 to indicate that the admissible pressure range is comprised between 0.12 and 0.17 $N/mn^2$; or even 00014 if it is desired to keep to a strict pressure of 0.14 $N/mn^2$.

Further characters could also be reserved if it is desired to allow certain tolerances and if the number of characters already available is not sufficient.

Finally, with these 47 active characters, it is possible in zone 7 to associate a final "even" character for verifying satisfactory acquisition of the aforementioned characters, two "start" and "finish" characters embracing everything to allow bi-directional scanning.

Possibly, an additional zone could also be provided. In this zone, which might embrace eight characters, would then be entered the codes corresponding to the temperatures, time and pressure(s) to be respected, then "shortcircuiting" the data in zone 6 and placing the machine in "manual" mode, the operator then defining himself the values of the said parameters to be applied to the welding process.

For any further information concerning examples, especially in connection with bar codes, reference may be made to Patents EP-A-0 272 978 or U.S. Pat. No. 4 837 424 the contents of which are incorporated into the present description by way of reference.

Figure 2:
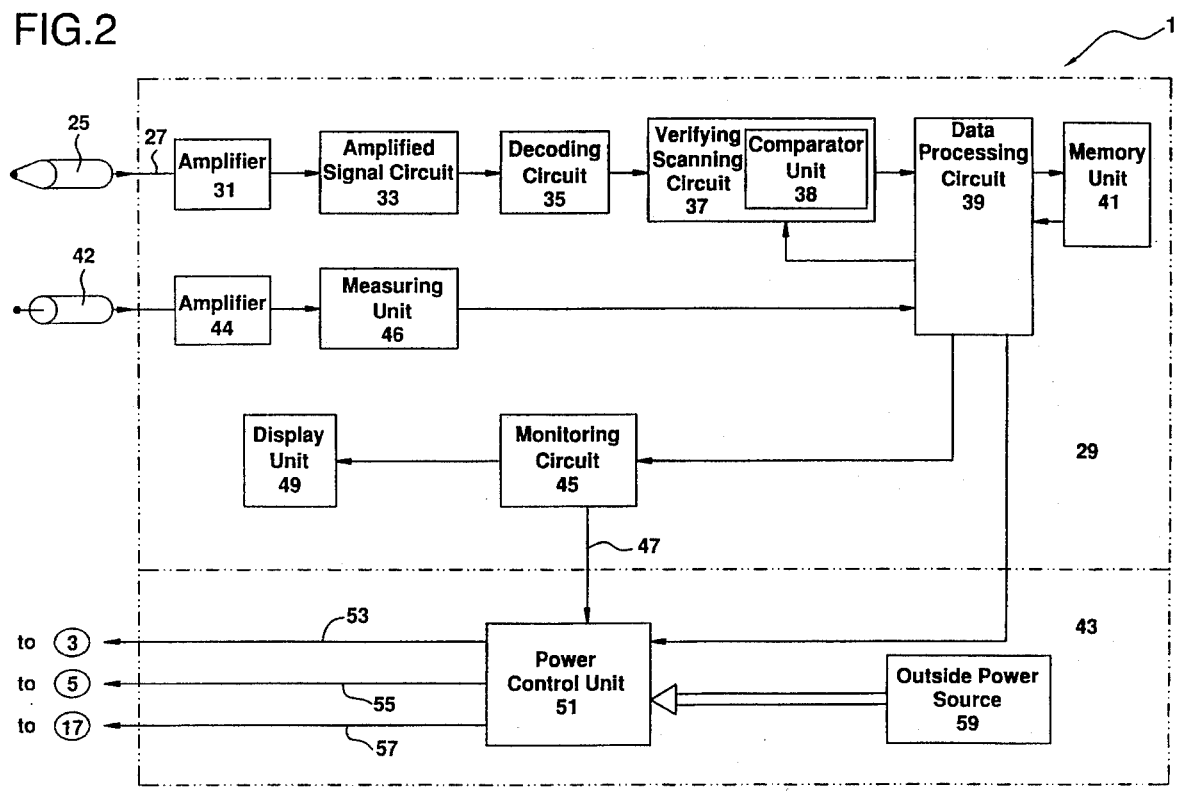
FIG. 2 is a synoptic overall diagram of the means of automating this welding process according to the invention.

Shown at 25 in FIG. 2 is the scanning means which can be used for reading the codes, 21, 23. In the case of a bar code, this will be an optical pencil or laser scanner. In the case of a magnetic code, it would also be possible to use a magnetic head.

The pencil 25 is connected by its cable 27 to the analogue/logic stage 29 of the casing 1 which will make it possible to input into the machine the operating data read successively through each code of the parts.

Inside the analogue/logic stage 29 the signals provided by the scanning means 25 will in succession encounter an amplifier 31, a circuit for forming the amplified signal 33, a decoding circuit 35, a verifying/scanning circuit 37 comprising a comparator unit 38, and a data processing circuit 39 controlled by a computer unit with an integrated microprocessor and associated with a memory unit 41.

The data acquired and relating to the characteristics scanned particularly in zones 2, 3 and 6 will be compared in the comparator unit 38.

If the data entered into the codes for each of these criteria agree from one code to another, that is to say if the data corresponds strictly or if the ranges allowed overlap, it is preferably envisaged that in these two cases compatibility between codes will be recognised.

Of course, during the course of data processing, the circuit 39 with which a memory unit 41 is associated, will be addressed.

Once compatibility is recognised, a logic signal will in any case be transmitted to the computer unit of the circuit 39 so that it will then be possible to determine the values representing the following essential parameters which will then be understood as common to the two parts which are to be welded.

In practice, these parameters are at least:

the heating temperature T to which the heating element 5 must be raised for the parts 7, 9 to reach at their ends which are to be connected, the softening (or fusion) temperature at which they can be welded;

the time $t_1$ for which these parts have to be placed in contact with the element 5, the pressure P to be exerted on at least one of these parts to bring them into contact with each other, and the time $t_2$ during which this contact pressure P between the parts 7 and 9 will have to be maintained.

This calculation of parameters can in particular be performed by calculation of mean values for each parameter, on the basis of overlapping values or ranges of values which in the codes correspond to the relative characteristics constituting pressure, temperature and time.

For the heating temperature T for example, if the code for the first part has in its first seven characters in zone 6 the datum 200 to 230 and if the second code has in the same part of its same zone the datum 190 to 220, then the computer unit 39 can for example, on the basis of the corresponding range of overlap (200 to 220), calculate the mean value which must be given to this heating temperature T, in other words 210° C.

Of course, it is possible to proceed in the same way in order to determine particularly the parameters $t_1$, $t_2$ and P.

Although compatibility may be recognised by the machine over all the aforesaid parameters, it is possible in spite of everything to find that the comparator unit 38 detects differences between the coded data corresponding for instance to the type of plastics material constituting the parts and/or the indices or ranges of indices for fluidity.

In order to avoid the machine then systematically preventing welding, it has been envisaged within the invention to input into a part of the memory unit 41 at least two compatibility tables relating respectively to the various types of material and known fluidity indices (or ranges of index).

Thus, when the comparator unit 38 is activated, it may obtain from this part of the memory 41 the compatibility data introduced into these tables and, according to these predetermined criteria, recognise in spite of everything the fact that certain compatibilities exist between the parts.

Possibly, other additional tables of values might be entered into other parts of the memory unit 41 to adjust the aforesaid common values T, P, $t_1$ and $t_2$ in order to take into account variation in types of material or fluidity indices detected among the codes.

However this may be, once the characteristics for temperature (T), pressure(s) (P) . . . ) and time ($t_1$,$t_2$, . . . ) have been established, after scanning the codes, the preset software programme of the machine will address the power stage 43 with the command signals appropriate to the supply of the voltages and/or power strengths suitable for these parameters.

If, in spite of everything, it should happen that the comparator unit 37 to 38 detects an incompatibility among certain parts of the two codes read by the scanner 25, there is furthermore provision for a monitoring circuit 45 associated with the unit 39 to command, via the line 47, stoppage of the welding cycle with a parallel display of error or stoppage data on a display unit 49.

Once the compatibility of the codes has been verified by the unit 37 and the operating data in terms of current strength(s) and/or voltage(s) and period(s) of time have been provided by the unit 39, the power control unit 51 of the stage 43 will be in a position to supply the power required for the period of time determined, doing so to one of the three cables 53, 55, 57 connected respectively to the trimming unit 3, the heating mirror 5 and the jack unit 17, the said electric power possibly being provided by an outside source 59 such as for example that of the general electricity mains or by an on-site generator (direct current a priori).

It will also be seen from FIG. 2 that there is attached to the machine a temperature sensor 42 intended to register the temperature of the parts at the onset of the intervention, making it possible to adjust the welding programme data in the event of a considerable divergence of temperature in respect of a predetermined ambient working temperature. For this, the sensor 42 is connected via the amplifier 44 and the measuring unit 46 to the aforesaid processing unit 39.

As has already been described hereinabove, rather than entering into zone 6 the numerical values of the compatibility test parameters (pressure, time, temperature . . . ), it should be noted that there is also provision within the invention for all these data to be "regrouped" in each code under a signal datum corresponding to a standard welding reference, which may well be very useful particularly in the event of the part 7 for which the code has been established, so that it is welded according to a standard (I) may need to be welded to the part 9 according to a standard (II).

In other words, and in particular if there are likely to be problems of divergence of standards, the invention envisages, for each code, reducing zone 6 for instance to two characters, indicating then just the standardisation reference according to which welding must be performed.

In this case, with a zone 6 reduced in this way, it will be into the internal memory unit 41 that the scales of values relative to the welding parameters (time, temperature(s), pressure(s)) will need to be entered. And it is from there that the preset software programme will draw its information, according to the coded data provided by the scanner 25 in order to pass to the power stage 43 the appropriate operating signals to deliver the appropriate voltages and/or current strengths to the jack unit 17.

For any information concerning, for example, the standard applicable in France for butt-welding two polyethylene parts, reference can be made to the publication of the "Polyethylene" Standard by "Institute of Welding", a document edited and published by "Autogenous Welding Publications" (D.V.S. 2207 Documentation and entitled "Welding of Thermoplastic Polyethylene Parts", pages 1 to 14, May 1984). The contents are included in the present description by way of reference.

However, if it is desired to avoid having then to enter into memory whole tables of values to be allocated to the chosen parameters, one suggested solution is to constitute these data in the form of mean values of parameters over a plurality of existing standards in order thus to arrive at an average welding law.

Another solution would be to define and enter into memory a coefficient or a table of adjusting coefficient(s) as a function of the coded standards, making it possible to make several standards compatible.

With reference now to FIGS. 1 to 7 as a whole, an embodiment for the butt-welding of two tubes 7 and 9 in FIG. 1 will now be described, the tubes having been correctly placed in alignment between the clamping jaws of the frame 11.

With the two parts in position in this way, the first stage will be to use the scanner 25 successively to read each of the two codes 21, 23 of the parts so that the unit 39 acquires their data.

If it is assumed that one is faced with the second hypothesis considered within the invention, in other words a reduced zone 6 containing a Standard reference, the scanner 25 will then, for each code and therefore for each tube, provide the machine with the reference in question and, in the example chosen, the physical nature of the material of the part in question, the type of part concerned, the thickness of the tube, its cross-section, its length, its date of manufacture, its validation code (in relation to the last possible date of use) and the identify of the manufacturer.

A comparison of the two codes by the unit 37 will then be performed in a machine for verifying the compatibility of the two tubes in order to validate the stages to come.

If the two codes are identical or compatible, the unit 39 will then have recourse to the parameters memorised in the memory unit 41 so that, as a function of the data just acquired, the parameters of the "welding standard" to be respected in relation to the length of time and the electric power to provide will then be implemented.

It should be noted that if compatibility tables have been stored in the memory, it will then be possible for example to allow the welding of two structurally identical tubes (same dimensions (outside diameter, thickness . . . ), same materials) but the codes of which contain different projected welding standards (because they were processed in different countries).

Thanks to this(these) table(s) of compatibility, the welding law adapted to the place where the operation is performed may be determined by the machine and the operation can be carried out under the best conditions.

An electrically controlled mechanical sequence will then follow.

Once the trimming apparatus 3 (see FIG. 3) has been placed in position between the correctly spaced-apart ends of the two tubes, the power unit 51 will, via the line 55, control the displacement of the jack unit 17 and the tubes will be suitably pressurised.

Once the trimming/finishing operation has been carried out, and after the connections of the still aligned tubes have been checked for cleanliness and parallelism, the machine will control them and move them away from each other so that the apparatus 3 can be withdrawn and the heating mirror 5 can replace it, as shown in FIG. 5. As the automated control programme develops, the heating phase will then be triggered and, after the regulated temperature (usually around 200° to 250° C.) has been reached at the two oppositely disposed contact faces 5a, 5b of the mirror 5, the machine will bring about the required pressurised contact of the tubes with these faces by correlating the parameters contained in the memory 41 with the working data read on the tubes for the codes.

Figure 8:
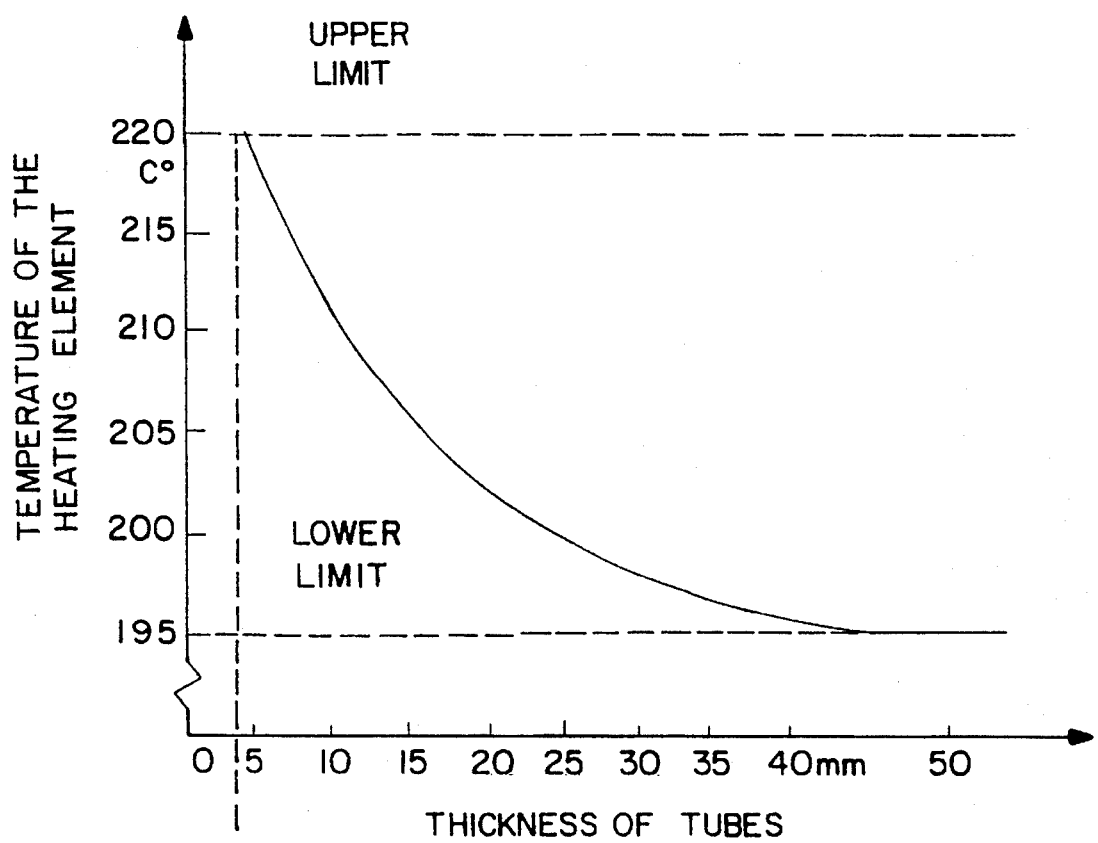
FIG. 8 shows an example of a temperature/thickness curve capable of being input into the memory of the machine.

It is possible to store in the memory of the machine for instance the equivalent of the table A below and of FIG. 8 making it possible particularly on a basis of the thickness of the tubes and their cross-section at the joint, and even the type of material and/or the fluidity index (not considered in the case in point), to determine, by calculation in the unit 39, the values of the welding parameters to be respected in terms of temperature, time and pressure (or force). It should be noted that in the example chosen (with regard to the DVS standard), the force or pressure needed for equalisation and welding may be determined and stored on a basis of the pressure $p=0.15$ N/mm², taking into account the force or pressure needed for displacement of one of the tubes (the other being assumed to be fixed.

sufficient that the material from which they are made heats to the point of fluidity and, fusing to form two beads 7a, 9a, the pressure possibly being reduced during the heating time, with a softening down to approx. 0.01 N/mm² (DVS standard).

In the end, the machine, still working through the jack unit 17, will cause the tubes to move apart and withdraw the heating mirror 5 (see FIG. 6), then moving them towards each other and pressing the two fluidised ends against each other, the pressure being maintained until the joints have cooled (see FIG. 7). During this time, the two beads 7'a, 9'a will complete their formation.

It must be evident that if the climatic conditions at the moment of welding seem to the operator, even prior to the finishing operation, to be likely to affect the quality of the weld (wind, rain . . . ) the possible acquisition of the initial temperature of the parts to be welded via the temperature sensor 42 will have made it possible to correct the electric power finally delivered by the machine in the event of the temperature measurements actually showing a fairly considerable divergence in relation to the preset nominal temperature which will usually be about 23° C. for currently used plastic resins.

With reference now to the case shown where the zone 6 of each code itself embodies the numerical values attributable to the compatibility criteria likely to be adopted there follows an illustrative table (B) of possible values of these parameters, on the hypothesis that it is necessary to butt-weld two high density (PEHD) polyethylene tubes having as a fluidity index a strictly chosen value: $IF_5=0.45$ (the index "5" indicating that the usual test has been conducted with a

TABLE A

| Wall thickness mm | Equalisation under p = 0.15 N/mm² height of the bead prior to commencement of the heating time mm | Heating under p = 0.01 N/mm2 heating time S | Maximum duration between end of heat- and start of welding S | Cooling under welding pressure p = 0.15 N/mm² Total time until satisfactory cooling mins |
|---|---|---|---|---|
| 2 to 3.9 | 0.5 | 30 to 40 | 4 | 4 to 5 |
| 4.3 to 6.9 | 0.5 | 40 to 70 | 5 | 6 to 10 |
| 7.0 to 11.4 | 1.0 | 70 to 120 | 6 | 10 to 16 |
| 12.2 to 18.2 | 1.0 | 120 to 170 | 8 | 17 to 24 |
| 20.1 to 25.5 | 1.5 | 170 to 210 | 10 | 25 to 32 |

In practice, the trimmed ends of two tubes will be applied to the faces of the mirror with a pressure and for a time 5 kg weight, the volumetric mass of the resin being 946 kg/cu.m at 23° C.).

TABLE B

| PARAMETERS | | UNIT | VALUE |
|---|---|---|---|
| Temperature of the mirror T | | | |
| $63 \leq d_e \leq 250$ | | °C. | (210 ± 15° C.) |
| $d_e > 250$ | | | (225 ± 10° C.) |
| | Pressure P1 | N/mm2 (MPa) | 0.18 + 0.02 |
| PHASE 1 | Time t1 | S | to obtain B1 |
| | Bead B1 | mm | de ≤ 180   1 < B1 ≤ 2 |
| | | | 180 < de ≤ 315   2 < B1 ≤ 3 |
| | | | 315 < de   3 < B1 ≤ 4 |
| | Pressure P2 | N/mm2 (MPa) | 0.03 ± 0.02 |
| PHASE 2 | Time t2 | S | 30 + de/2 ± 10 |
| PHASE 3 | Time t3 | S | max: 3 + 0.01 de ≤ 8 |
| PHASE 4 | Time t4 | S | max: 3 + 0.03 de ≤ 6 |
| | Pressure P5 | N/mm2 (MPa) | 0.18 ± 0.02 |
| PHASE 5 | Time t5 | min | minimum: 10 |
| PHASE 6 | Time t6 | min | min 1.5 e and maximum 20 |

TABLE B-continued

| CONDITIONS °C. | AMBIENT TEMPERATURE T° C. | MIRROR TEMPERATURE N/mm2 | WELDING PRESSURE |
|---|---|---|---|
| Minimum | Tm +0 −5 −2 | 205 ± 5 | 0.15 ± 0.02 |
| Maximum | TM 40 ± 2 | 230 ± 5 | 0.21 ± 0.02 |

In this table:
p = welding pressure applied to the face of the tube (for example) to be welded
t = time of each phase of the welding cycle
e = nominal thickness of the tube
de = nominal outside diameter of the tube
TR = reference temperature: 23° C. + 2° C.
TM = maximum ambient temperature
Tm = minimum ambient temperature.

The "mirror" is the heating element 5.

The ambient temperature is the temperature at which assembly is performed. It may vary between the minimum temperature Tm and maximum temperature TM.

According to the welding parameters adopted:

the temperature of the mirror 5 (T) is the temperature measured on the face of the mirror, in the zone in contact with the walls to be welded, the pressure $P_1$ during the phase of heating of the tubes is the pressure (in $N/mm^2$) which can be applied in the tube/mirror contact zone, the value of the bead $B_1$ is the dimension (thickness) of the bead (in mm) which has to form on the end of the tube by reason of its being heated and the "pressure" of contact $P_1$.

the heating time $t_1$ is the time (in seconds) needed to obtain the bead $B_1$, the time t3 is the time which may elapse between separation of the tube from the mirror and the moment when the tubes are brought directly into end-to-end contact, the time t4 is the time it takes for the pressure in the tubes to rise to a level needed to establish the welding pressure P5, P5 is this contact pressure between the tubes, t5 is the time corresponding to the period for which the pressure P5 is maintained, t6 is then the cooling time during which the welded parts are still left prior to being handled, and B2 is the thickness of the bead which must be obtained at the end of t6.

Of course, especially these criteria may be adopted partially or in their entirety as test parameters for compatibility, according to the invention.

We claim:

1. A method of selectively butt-welding two tubular parts of plastic material using an automatically controlled machine, comprising the steps of:

scanning an identification code associated with each of two tubular parts of plastic material to be welded, said identification code comprising data related to certain characteristics of said tubular parts which are entered in an order and at specific positions for each code;

acquiring said data stored within said identification code at said scanning step;

comparing said data from said acquiring step, datum by datum;

determining if said acquired data relating to said characteristics contained within said codes are in accordance in pairs, whereby a compatibility between said codes is recognized and a series of values common to said two parts is determined; and supplying said series of values to a welding program associated with said machine controlled by a computer unit with an integrated microprocessor and an associated memory unit for processing said data in order to allow welding of said tubular parts with a heating element as a function of said series of values.

2. A method of selectively butt-welding two tubular parts of plastic material using an automatically controlled machine, in accordance with claim 1 wherein said characteristics include at least one of:

the thickness and/or outside diameter of said tubular part at its end where it has to be welded substantially coaxially to said other tubular part; the temperature or range of temperature, corresponding to that which an electric heating element has to be raised for the said tubular part to reach at its abutment end the softening temperature appropriate to its welding; the period of time during which the said tubular part has to be placed in contact with said heating element; the period of time during which the said tubular part has to undergo a pressure against said other tubular part; the pressure or range of pressure corresponding to that which the said tubular part must undergo during said period of time; the type of plastics material constituting said tubular part; and the index or range of indices of fluidity of said plastic material.

3. A method of selectively butt-welding two tubular parts of plastic material using an automatically controlled machine, in accordance with claim 1 wherein said acquiring step further comprises:

entering said data in an analogue/logic stage;

successively amplifying said data so as to form an amplified signal using an amplifier;

decoding said data using a decoding circuit; and verifying/scanning said data with a data processing circuit comprising a comparator unit for verifying/scanning said data and a data processing circuit controlled by a computer unit with an integrated microprocessor and an associated memory unit for processing said data.

4. A method of selectively butt-welding two tubular parts of plastic material using an automatically controlled machine, in accordance with claim 1 wherein said determining step further comprises:

determining said series of values relatively with respect to the temperature T of heating to which said heating element has to be raised for said tubular parts to reach at their abutting ends a softening temperature appropriate to welding them; to the time $t_1$ during which said tubular parts have to be placed in contact with said heating element; to the contact pressure P to be exerted on at least one of the said tubular parts to press one part against the other; and to the time $t_2$ for which said contact pressure has to be maintained between said tubular parts.

5. A method in accordance with claim 4, wherein said determining step further comprises:

matching of the said indices or ranges of indices for fluidity and material type obtained during said acquiring step with compatibility criteria contained in at least two tables associated with said memory unit and relating to the type of material and to the index or range of indices, respectively, and determining compatibility between the said tubular parts even if the indices or ranges of indices for fluidity of said plastic material and material types are not identical for both identification codes of said tubular parts.

6. A method in accordance with claim 1, wherein said determining step further comprises:

entering into each said code numerical values or ranges of values relative to at least some of the said characteristics and appropriate to the tubular part in question;

comparing these said values or ranges of values between the two codes;

determining, subject to predetermined tolerances, the series of aforesaid values common to both tubular parts ($t_1$, $t_2$, P, T) which are identical or overlap;

whereby the said tubular parts may be welded with virtually no risk of error as to their compatibility with respect to essential parameters of welding.

7. A method in accordance with claim 4, wherein said determining step further comprises:

entering into each said code numerical values or ranges of values relative to at least some of the said characteristics and appropriate to said tubular part in question;

comparing these said values or ranges of values between the two codes;

determining, subject to predetermined tolerances, the series of aforesaid values common to both tubular parts ($t_1$, $t_2$, P, T) which are identical or overlap;

whereby said tubular parts may be welded with virtually no risk of error as to their compatibility with respect to essential parameters of welding.

8. A method in accordance with claim 6, wherein said determining step further comprises:

determining the said series of values common to said two tubular parts ($t_1$, $t_2$, P, T) by a calculation of mean values on the basis of values or ranges of values which overlap and which, in said codes, correspond to said characteristics.

9. A method in accordance with either claim 1, 5, 6, 7, or 8, further comprising the steps of:

trimming butted ends of said tubular parts and if compatibility of the codes has been recognized;

inserting between said butted ends said heating element previously brought to said specific heating temperature T;

bringing said parts into contact with the said heating element for said determined period of time $t_1$;

withdrawing under control said heating element;

bringing the two softened abutting ends of said tubular parts into contact at the said predetermined welding pressure P, with said pressure P being maintained for said specified length of time $t_2$;

allowing said tubular parts to cool in order to achieve said weld;

whereby said tubular parts may be welded with virtually no risk of error as to their compatibility with respect to essential parameters of welding.

10. A method in accordance with claim 9, further comprising the steps of:

delivering to said heating element a specific voltage and/or current intensity to satisfy the criteria for temperature T and pressure P; and registering the temperature of said tubular parts at the commencement of welding before the operation of trimming the abutting ends of said tubular parts is carried out, the registered temperature of said tubular parts being transmitted to said welding program in order to adapt the length of time, the voltage and/or the intensity of the electric current applied to the heating element as a function of the recorded temperature of said tubular parts.

11. A method in accordance with claim 1, further comprising the steps of:

regrouping under a specified welding standard reference (zone 6) at least some of said data into each identification code;

storing scales of values relating to said regrouped data in said memory associated with said machine;

allocating to each said code under the said standard reference (zone 6), said scales of values;

comparing said allocated values code by code; and if these values agree, determining said values for temperature, pressure and time common to said tubular parts by calculation of mean values.

12. A method in accordance with claim 1, further comprising the steps of:

regrouping under a specified welding standard reference (zone 6) at least some of said data into each code;

storing scales of values relating to said regrouped data in said memory associated with said machine;

allocating to each said code under the said standard reference (zone 6), said scales of values;

comparing said allocated values code by code; and if these values agree, determining said values for temperature, pressure(s) and time, by applying an adjusting coefficient as a function of the welding standard references appropriate to said codes.

* * * * *